United States Patent
Ince et al.

(10) Patent No.: US 8,905,643 B2
(45) Date of Patent: Dec. 9, 2014

(54) THERMAL COMPENSATION ELEMENT WITH WAVE SPRING

(75) Inventors: Marion Jack Ince, Mount Holly, NC (US); Guihui Zhong, Charlotte, NC (US); Robert Southam, Tega Cay, SC (US); Charles Schwab, Fort Mill, SC (US); Michael Turner, Fort Mill, SC (US); Brian Lee, York, SC (US)

(73) Assignee: Schaeffler Technologies AG & Co. KG, 91074 Herzogenaurach (DE)

( * ) Notice: Subject to any disclaimer, the term of this patent is extended or adjusted under 35 U.S.C. 154(b) by 69 days.

(21) Appl. No.: 13/359,788

(22) Filed: Jan. 27, 2012

(65) Prior Publication Data

US 2012/0195537 A1 Aug. 2, 2012

Related U.S. Application Data

(60) Provisional application No. 61/437,189, filed on Jan. 28, 2011.

(51) Int. Cl.
| | |
|---|---|
| *F16C 33/04* | (2006.01) |
| *F16C 19/24* | (2006.01) |
| *F16C 35/073* | (2006.01) |
| *F16C 19/52* | (2006.01) |
| *F16C 19/56* | (2006.01) |
| *F16C 19/18* | (2006.01) |
| *F16C 35/077* | (2006.01) |

(52) U.S. Cl.
CPC .............. *F16C 35/073* (2013.01); *F16C 19/525* (2013.01); *F16C 19/56* (2013.01); *F16C 2300/54* (2013.01); *F16C 19/182* (2013.01); *F16C 35/077* (2013.01)
USPC ............................ 384/493; 384/557; 384/605

(58) Field of Classification Search
CPC ........ F16C 19/525; F16C 17/22; F16C 25/08; F16C 25/0863; Y10S 384/905
USPC .................. 384/493, 905, 557, 605; 267/159, 267/161–164; 403/282
See application file for complete search history.

(56) References Cited

U.S. PATENT DOCUMENTS

| | | | | |
|---|---|---|---|---|
| 3,608,256 | A * | 9/1971 | Jefferys | 52/182 |
| 4,718,781 | A * | 1/1988 | Gerard | 384/495 |
| 5,028,152 | A * | 7/1991 | Hill et al. | 384/557 |
| 5,470,101 | A * | 11/1995 | Ennis | 280/728.2 |
| 5,743,669 | A * | 4/1998 | Fujita et al. | 403/131 |
| 6,536,983 | B1 * | 3/2003 | Morefield | 403/278 |
| 7,037,025 | B2 * | 5/2006 | Takahashi et al. | 403/282 |
| 7,614,378 | B2 * | 11/2009 | Williams | 123/184.21 |
| 7,698,799 | B2 * | 4/2010 | Parker et al. | 29/524.1 |
| 2012/0106884 | A1 * | 5/2012 | Doerrfuss et al. | 384/493 |

* cited by examiner

*Primary Examiner* — Marcus Charles
*Assistant Examiner* — Yamilka Pinero Medina
(74) *Attorney, Agent, or Firm* — Simpson & Simpson, PLLC

(57) ABSTRACT

A thermal compensation element which has an inner ring, an outer ring, and a washer. The washer is arranged within the inner ring and the outer ring is mounted over the inner ring, encapsulating the washer, which can be a split wave spring. The inner ring and the outer ring each have retention features to ensure they are retained relative to each other. The thermal compensation, which is positioned between a housing or a shaft, can account for variations in loading and/or temperature that may occur to a bearing and a shaft system when the shaft and an associated component are made of different materials and have different coefficients of thermal expansion by ensuring a proper axial preload is maintained on the bearing.

10 Claims, 5 Drawing Sheets

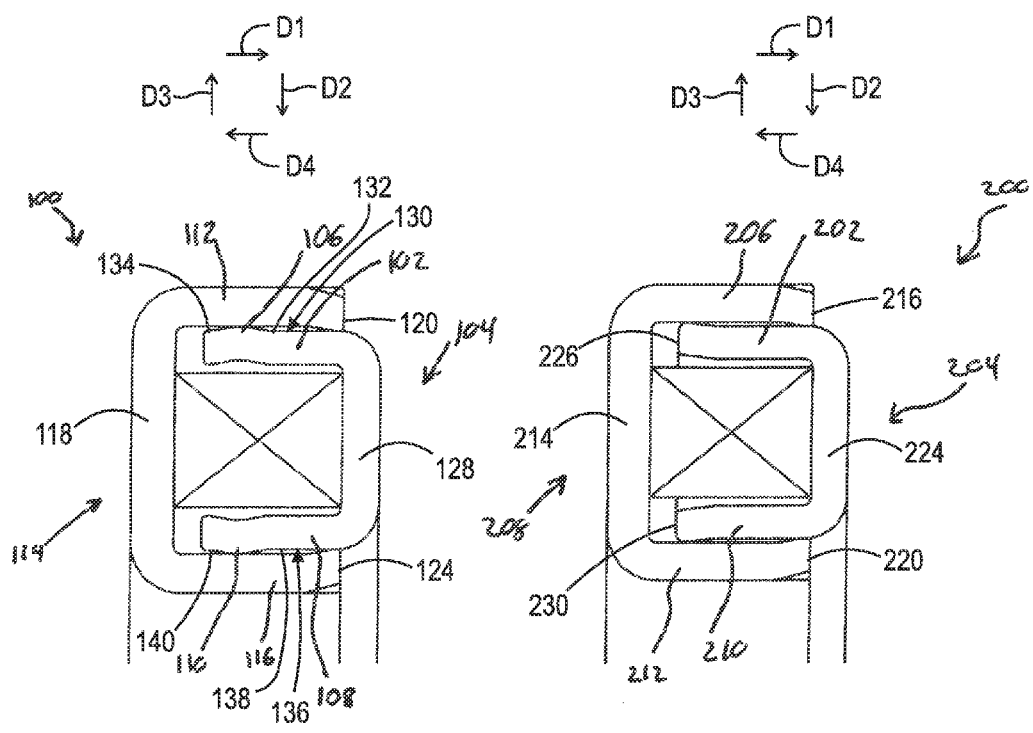
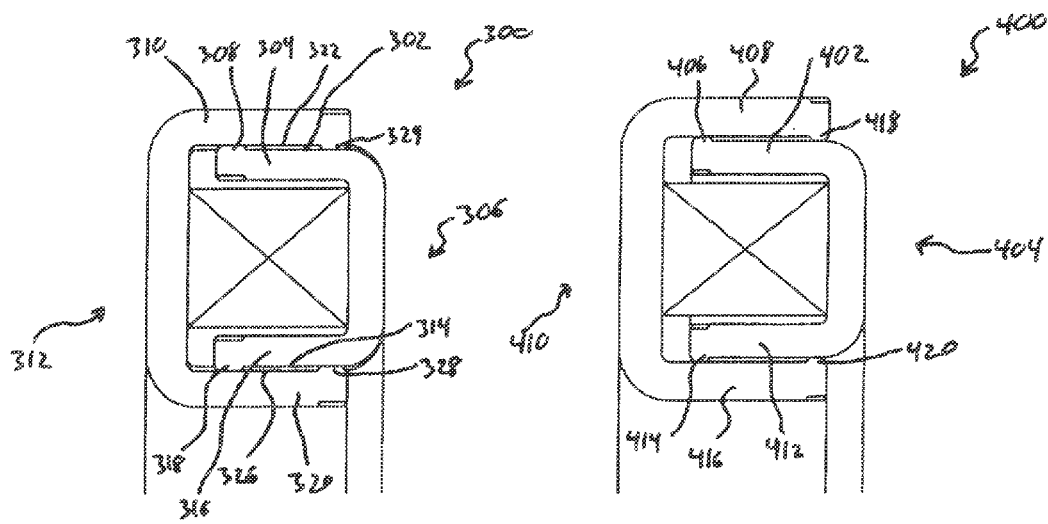

THERMAL COMPENSATION ELEMENT WITH WAVE SPRING

This application claims the priority U.S. 61/437,189 filed Jan. 28, 2011 which is incorporated by reference herein.

FIELD OF INVENTION

The present invention relates generally to bearings and more particularly to a thermal compensation element which accounts for thermal changes that may occur in applications utilizing bearings or the like that require axial preload for proper functionality.

BACKGROUND OF THE INVENTION

The use of an elastomeric material to compensate for thermal expansion and contraction of components which have dissimilar materials and are used in conjunction with each other are known, see, for example, U.S. Pat. No. 5,028,152. Such an arrangement includes inserting an elastomer into a cavity within a machined outer ring of a bearing, bonding an elastomer to a metallic backing, or encapsulating an elastomer within two cups which are snapped into a cavity in an outer ring or an inner ring. However, there are various drawbacks to such arrangements. For example, such arrangements can affect the load carrying capability of the bearing. The bonding of an elastomer to a metallic backing is an especially costly process. Moreover, encapsulated design with two cups requires a special profiled elastomer which is difficult to assemble and the elastomer increases the tolerance stack-up. Additionally, the encapsulated design requires shimming on an individual basis when trying to achieve a desired preload at the application assembly. Further, many elastomeric materials are compressible and cannot withstand variation in temperature cycles.

SUMMARY OF THE INVENTION

The present invention is directed to a thermal compensation element, which is positioned between a bearing and a shoulder of a housing or a shaft and can account for high loads and extreme variations of temperature that may occur to a bearing and shaft system when the shaft and an associated housing for a transmission, gearbox, axle or the like are comprised of different materials and have different coefficients of thermal expansion (e.g., sheet metal shaft and an aluminum housing). Due to the differences of materials and different coefficients of thermal expansion, the rates of expansion and contraction can vary causing a wide variation in bearing preload over a range of temperatures. This variation can lead to an increased preload, an increased frictional torque, and/or a loss of preload, which in turn can lead to a reduction in the life of the bearing and noise.

The present invention, which is inexpensive and relatively easy to manufacture and assemble, compensates for the potential loading and thermal changes without affecting the bearing's load carrying capacity by maintaining a preload force on the bearing regardless of the size of the components surrounding the bearing. Through expansion and compression, the thermal compensating element ensures shaft system stiffness and aids in maintaining the life of the bearing. Further, the thermal compensation element reduces axial tolerance stack-up with the only variation being due to the wall thickness of the cup formed by the inner ring and the outer ring.

It should be noted that the present invention can be used in conjunction with various types of bearings including, but not limited to angular contact ball bearings, tandem ball bearings, tapered roller bearings.

Broadly, the present invention can be defined as a thermal compensation element, which can comprise an inner ring, an outer ring, and a washer, which can be arranged within a channel of the inner ring with the outer ring being mounted over the inner ring, encapsulating the washer.

The washer can be a split wave spring.

The inner ring can have a U-shaped cross-section with a first wall extending from a first end of a base and a second wall extending in a same direction as the first wall from a second end of the base. The first flange and the second flange of the inner ring can each have an inner face and an outer face. Also, the outer ring can have a U-shaped cross-section with a first wall extending from a first end of a base and a second wall extending in a same direction as the first wall from a second end of the base. The first flange and the second flange of the outer ring can each have an inner face and an outer face.

The inner ring can have a first channel in which the washer is arranged and the outer ring can have a second channel.

The inner ring and the outer ring can be movable axially relative to each other.

The outer face of the first wall of the inner ring can have a first protrusion which is contactable with the inner face of the first wall of the outer ring and the outer face of the second wall of the inner ring can have a second protrusion which is contactable with the inner face of the second wall of the outer ring. Also, the first wall of the outer ring can be bent inward and can be contactable with the outer face of the first wall of the inner ring and the second wall of the outer ring can be bent inward and can be contactable with the outer face of the second wall of the inner ring.

Also, the first wall of the inner ring can be bent outward and can be contactable with the inner face of the first wall of the outer ring and the second wall of the inner ring can be beat outward and can be contactable with the inner face of the second wall of the outer ring. Also, the first wall of the outer ring can be bent inward and can be contactable with the outer face of the first wall of the inner ring and the second wall of the outer ring can be beat inward and can be contactable with the outer face of the second wall of the inner ring.

Alternatively, a first tab can protrude outward from the outer face of the first wall of the inner ring, near a first end region and a groove can extend along the outer face of the first wall of the inner ring up to the first tab and a second tab can protrude outward from the outer face of the second wall, near a second end region and a groove can extend along the outer face of the second wall of the inner ring up to the second tab. Also, a third tab can protrude outward from the inner face of the first wall of the outer ring, near a first end region and a groove can extend along the inner face of the first wall of the outer ring up to the third tab, and a fourth tab can protrude outward from the inner face of the second wall of the outer ring, near a second end region and a groove can extend along the inner face of the second wall of the outer ring up to the fourth tab such that the first tab of the inner ring can be in sliding contact with the groove of the first wall, the second tab can be in sliding contact with the groove of the second wall of the outer ring, the third tab of the outer ring can be in sliding contact with the groove of the first wall of the inner ring and the fourth tab of the outer ring can be in sliding contact with the groove of the second wall of the inner ring.

Further, a first wall of the inner ring can have a first lip protruding outward from the outer face of the first wall which can be in sliding contact with the inner face of the first wall of the outer ring and the second wall of the inner ring can have a second lip protruding outward from the outer face of the second wall which can be in sliding contact with the inner face of the second wall of the outer ring. Also, the first wall of the outer ring can have a third lip protruding inward from the inner face of the first wall which can be in sliding contact with the outer face of the first wall of the inner ring and the second wall of the outer ring can have a fourth lip protruding inward from the inner face of the second wall which can be in sliding contact with the outer face of the second wall of the inner ring.

The first wall and the second wall of the inner ring can be a predetermined length, providing a positive stop to protect the washer from plastic deformation.

The thermal compensation element can be positioned between a housing/shaft system shoulder and a bearing.

The bearing can be a tandem ball bearing, an angular contact ball bearing, or a tapered roller bearing.

The bearing can be preloaded axially through the thermal compensation element, compressing the washer at a position between fully free and a positive stop.

BRIEF DESCRIPTION OF THE DRAWINGS

The present invention will be further understood and appreciated by reading the following description in conjunction with the accompanying drawings, in which:

FIG. 7 is a cross-sectional view of a first embodiment of the thermal compensation element of the present invention;

FIG. 8 is a cross-sectional view of a second embodiment of the thermal compensation element of the present invention;

FIG. 9 is a cross-sectional view of a third embodiment of the thermal compensation element of the present invention; and FIG. 10 is a cross-sectional view of a fourth embodiment of the thermal compensation element of the present invention.

DETAILED DESCRIPTION OF THE INVENTION

Figure 1:
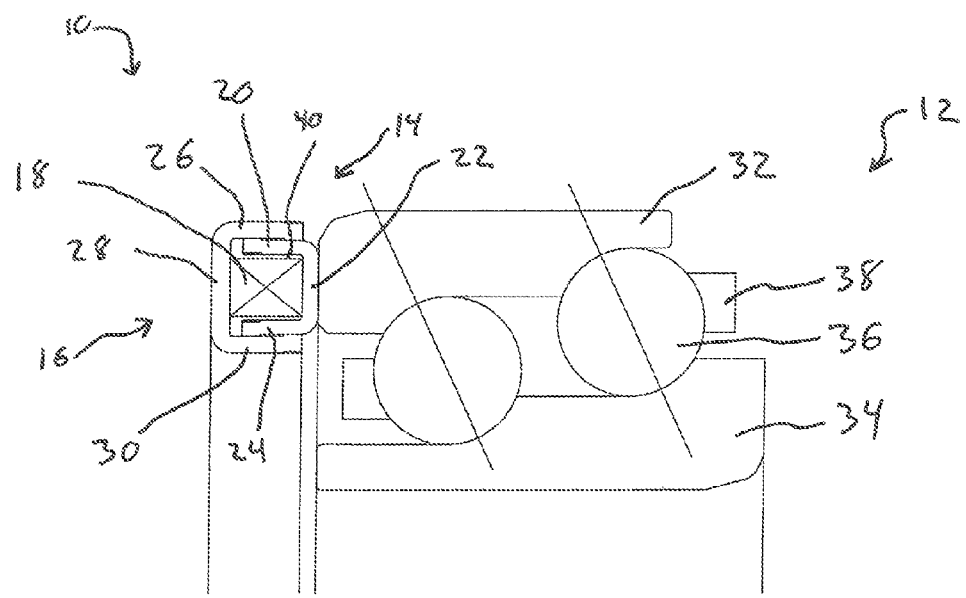
FIG. 1 is a partial cross-sectional view of a thermal compensation element of the present invention in contact with an outer ring of a bearing.
Figure 2:
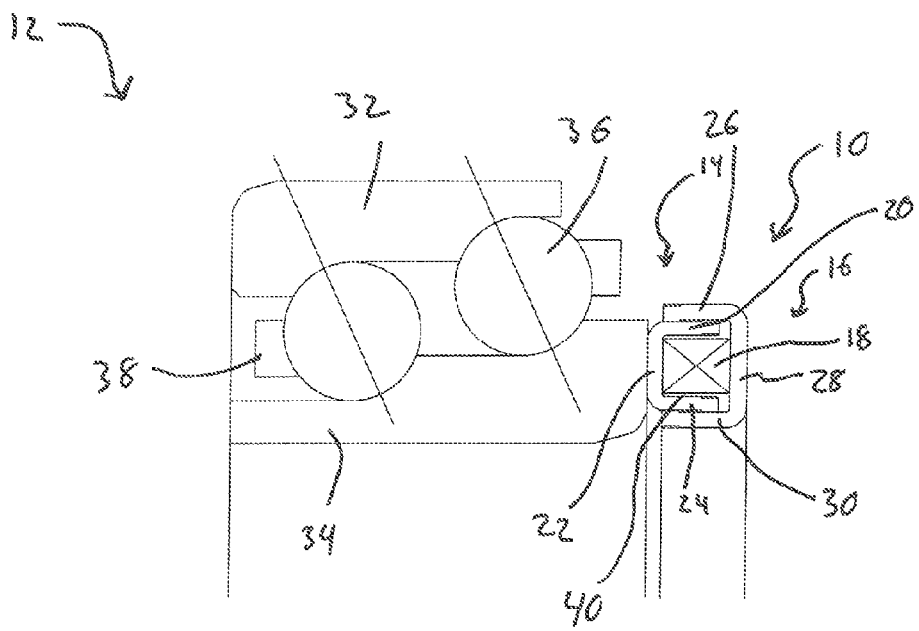
FIG. 2 is a partial cross-sectional view of the thermal compensation element of the present invention in contact with an inner ring of a bearing.
Figure 3:
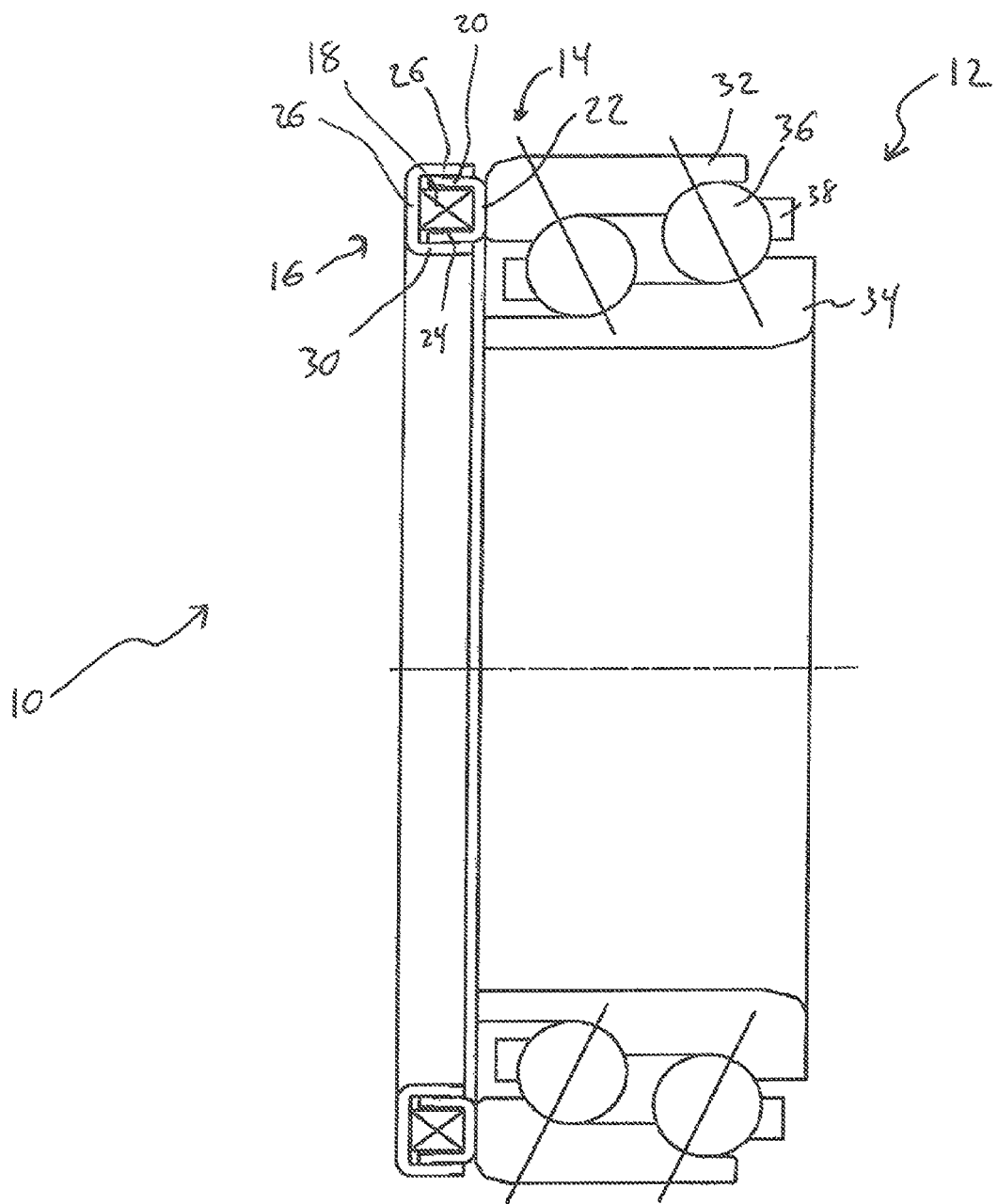
FIG. 3 is a cross-sectional view of a thermal compensation element of the present invention in contact with an outer ring of a bearing.

FIGS. 1-3 illustrate a thermal compensation element 10 positioned against a bearing 12. Typically, the thermal compensation element 10 is arranged between the bearing 12 and a housing/shaft system shoulder (not shown) to maintain proper preload even when the housing/shaft system is composed of dissimilar materials by expanding and compressing.

The thermal compensation element 10 includes an inner ring 14, an outer ring 16, and a washer or split wave spring 18. The inner ring 14 has a U-shaped cross-section with a first wall 20 extending from a first end of a base 22 and a second wall 24 extending in a same direction as the first wall 20 from a second end of the base 22. Similarly, the outer ring 16 has a U-shaped cross-section with a first wall 26 extending from a first end of a base 28 and a second wall 30 extending in a same direction as the first wall 26 from a second end of the base 28. The wave spring 18 is arranged within a channel formed by the walls 20, 24 and the base 22 of the inner ring 14. The outer ring 16 is then mounted, i.e. pressed over the inner ring 14, encapsulating the wave spring 18. The inner ring 14 and the outer ring 16 are movable axially relative to each other, but are retained by the interaction of the walls 20, 24, 26, 30. Such retention features can include formed tabs, staked tabs, machined tabs, grooves, cutouts, and the like or any combination of retention features. Also, the lengths of the walls 20, 24 of the inner ring 14 are predetermined so as to provide a positive stop to protect the wave spring 18 from plastic deformation.

As shown, the bearing 12 has an outer ring 32, an inner ring 34, roller bodies 36 which are arranged between the outer ring 32 and the inner ring 34, and a cage 38. The bearing 12 can be, for example, a tandem ball bearing, an angular contact ball bearing, a tapered roller bearing or the like.

Figure 4:
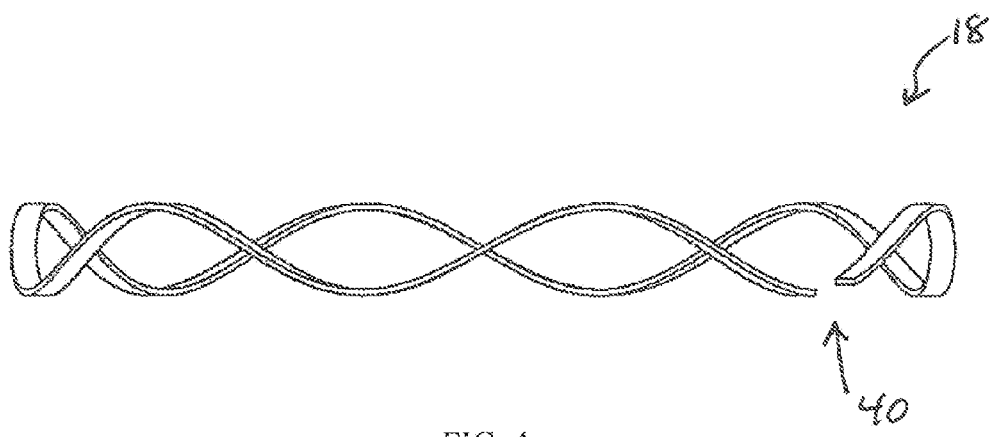
FIG. 4 is a perspective view of a wave spring of the present invention.
Figure 5:
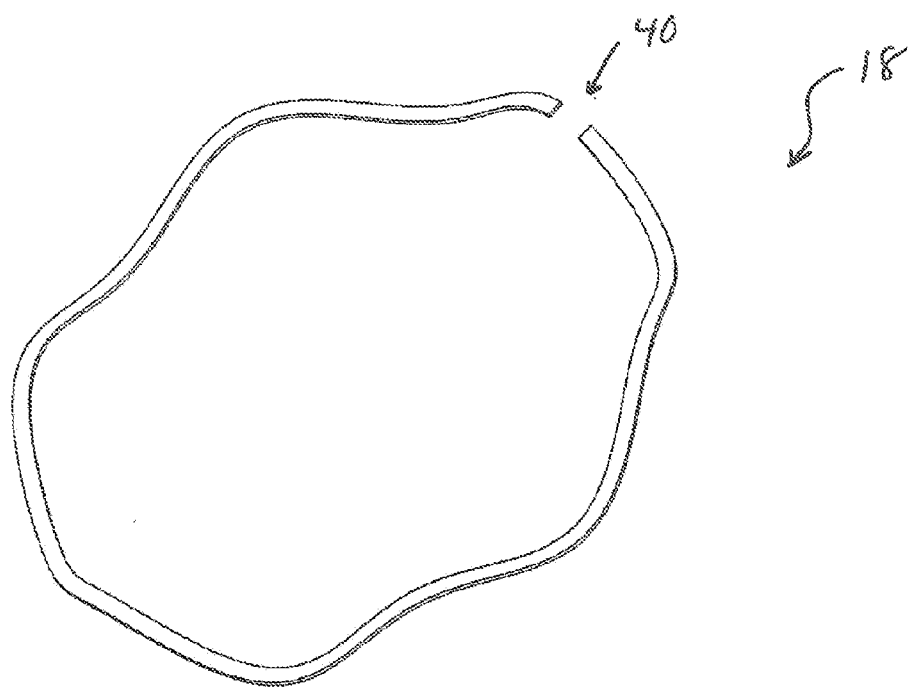
FIG. 5 is a further perspective view of the wave spring of the present invention.

FIGS. 4 and 5 show views of the wave spring 18 removed from the channel of the inner ring 14. The wave spring 18 applies a preload force to the bearing 12, and compensates for axial displacement of the housing/shaft system as the system is heated and cooled. For example, the distance between a shoulder of an aluminum housing and a shoulder of a steel shaft disposed in the housing can vary with change in temperature. In a system without a thermal compensating element, maintaining preload for the bearing 12 at high temperatures often results in excessive preload as the system contracts at low temperatures. Excessive preload can increase friction in the bearing 12, thereby decreasing its performance.

The thermal compensating element 10 uses the wave spring 18 to maintain a relatively consistent preload force on the bearing 12 as the housing/shaft system displaces at high and low temperatures. That is, the expansion and contraction of the housing/shaft system is compensated by deflection of the wave spring, with relatively minor differences in bearing preload at the various operating temperatures. The load-deflection characteristic of the wave spring is such that the spring force is somewhat constant for large changes in deflection.

Figure 6:
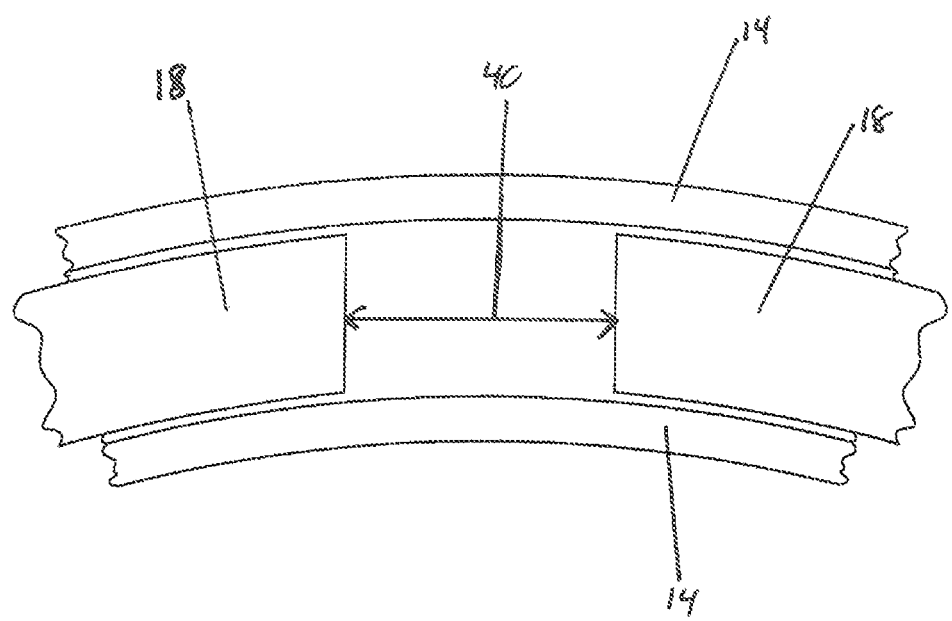
FIG. 6 is an axial view of an inner ring and the wave spring of the present invention.

FIG. 6 is an axial view depicting only the inner ring 14 and the wave spring 18 (outer ring 16 removed for clarity). As shown, the wave spring 18 is not continuous, but rather has a gap 40. The gap 40 allows the wave spring to deflect axially while maintaining a relatively constant diameter.

FIGS. 7-10 show a cross-section of various embodiments 100, 200, 300, 400 of the thermal compensation element 10.

FIG. 7 shows a first embodiment of the thermal compensation element 100. As shown, a first wall 102 of the inner ring 104, which has a U-Shaped cross-section, has a first protrusion 106 and a second wall 108 of the inner ring 104 has a second protrusion 110. The first protrusion 106 is in sliding contact with an inner face of a first wall 112 of an outer ring 114 and the second protrusion 110 is in sliding contact with an inner face of a second wall 116 of the outer ring 114. Also, the first wall 112 of the outer ring 114, which has U-Shaped cross-section, is bent inward and is in sliding contact with an outer face of the first wall 102 of the inner ring 104 and the second wall 116 of the outer ring 114 is bent inward and is in sliding contact with an outer face of the second wall 110 of the inner ring 104. The configuration allows for axial movement of the inner ring 104 and the outer ring 114 to maintain a proper preload while ensuring the inner ring 104 and the outer ring 114 do not axially separate.

FIG. 8 shows a second embodiment of the thermal compensation element 200. As shown, a first wall 202 of an inner ring 204, which has U-Shaped cross-section, is bent outward and is in sliding contact with an inner face of a first wall 206 of an outer ring 208 and a second wall 210 of the inner ring 204 is bent outward and is in sliding contact with an inner face of a second wall 212 of the outer ring 208. Similarly, the first wall 206 of the outer ring 208, which also has a U-Shaped cross-section, is bent inward and is in sliding contact with an outer face of the first wall 202 of the inner ring 204 and the second wall 212 of the outer ring 208 is bent inward and is in sliding contact with an outer face of the second wall 219 of the inner ring 204. The configuration allows for axial movement of the inner ring 204 and the outer ring 208 to maintain a proper preload while ensuring the inner ring 204 and the outer ring 208 do not axially separate.

FIG. 9 shows a third embodiment of the thermal compensation element 300. As shown, a groove 302 extends along an outer face of a first wall 304 of an inner ring 306, which has a U-Shaped cross-section, up to a first tab 308 which protrudes outward, toward a first wall 310 of an outer ring 312 and a groove 314 extends along an outer face of a second wall 316 of the inner ring 306, up to a second tab 318 which protrudes outward, toward a second wall 320 of the outer ring 312. Similarly, a groove 322 extends along an inner face of the first wall 310 of the outer ring 312, which also has a U-Shaped cross-section, up to a third tab 324 which protrudes inward, toward the first wall 304 of the inner ring 306 and a groove 326 extends along an inner face of the second wall 320 of the outer ring 312, up to a fourth tab 328 which protrudes inward, toward the second wall 316 of the inner ring 306. The first tab 308 and the second tab 318 are each in sliding contact with the grooves 322, 326, respectively, of outer ring 312 and the third tab 324 and the fourth tab 328 are each in sliding contact with the grooves 302, 314, respectively, of the inner ring 306. The configuration allows for axial movement of the inner ring 306 and the outer ring 312 along the grooves 302, 314, 322, 326 to maintain a proper preload while ensuring the inner ring 306 and the outer ring 312 do not axially separate.

Finally, FIG. 10 shows a fourth embodiment of the thermal compensation element 400. As shown, a first wall 402 of an inner ring 404, which has a U-Shaped cross-section, has a first lip 406 that extends outward and is in sliding contact with an inner face of a first wall 408 of an outer ring 410 and a second wall 412 of the inner ring 404 has a second lip 414 that extends outward and is in sliding contact with an inner face of a second wall 416 of the outer ring 410. The first wall 408 of the outer ring 410, which also has a U-Shaped cross-section, has a third lip 418 that extends inward and is in sliding contact with an outer face of the first wall 402 of the inner ring 404, and the second wall 412 of the outer ring 410 has a fourth lip 420 that extends inward and is in sliding contact with an outer face of the second wall 412 of the inner ring 404. The configuration allows for axial movement of the inner ring 404 and the outer ring 410 to maintain a proper preload while ensuring the inner ring 404 and the outer ring 410 do not aerially separate.

The present invention has been described with reference to a preferred embodiment. It should be understood that the scope of the present invention is defined by the claims and is not intended to be limited to the specific embodiment disclosed herein.

Returning to FIG. 7, outer ring 114 includes outer base 118. Outer wall 112 extends from outer base 118 in direction D1. Outer wall 112 includes distal end 120. Distal end 120 is opposite outer base 118 in direction D1. Distal end 120 is bent in direction D2 orthogonal to direction D1. Outer wall 116 extends from outer base 118 in direction D1. Outer wall 116 includes distal end 124. Distal end 124 is opposite outer base 118 in direction D1. Distal end 120 is bent in direction D3 opposite direction D2.

Inner ring 104 includes inner base 128. Inner wall 102 extends from inner base 128 in direction D4, opposite direction D1. Inner wall 102 includes outer face 130 with portion 132. Protrusion 106 extends from portion 132 in direction D3. Outer face 130 includes portion 134 extending beyond protrusion 106 in direction D4. Inner wall 108 extends from inner base 128 in direction D4. Inner wall 108 includes outer face 136 with portion 138. Protrusion 110 extends from portion 138 in direction D2. Outer face 136 includes portion 140 extending beyond protrusion 110 in direction D4.

Returning to FIG. 8, outer ring 208 includes outer base 214. Outer wall 206 extends from outer base 214 in direction D1. Outer wall 206 includes distal end 216. Distal end 216 is opposite outer base 214 in direction D1. Distal end 216 is bent in direction D2. Outer wall 212 extends from outer base 214 in direction D1. Outer wall 212 includes distal end 220. Distal end 220 is opposite outer base 206 in direction D1. Distal end 220 is bent in direction D3.

Inner ring 204 includes inner base 224. Inner wall 202 extends from inner base 224 in direction D4. Inner wall 202 includes distal end 226 opposite base 224 in direction D4. Distal end 226 is bent in direction D3. Inner wall 210 extends from inner base 224 in direction D4. Inner wall 210 includes distal end 230 opposite base 224 in direction D4. Distal end 230 is bent in direction D2.

Reference Characters

10 Thermal Compensation Element
12 Bearing
14 Inner Ring
16 Outer Ring
18 Washer or Split Wave Spring
20 First Wall of the Inner Ring
22 Base of the Inner Ring
24 Second Wall of the Inner Ring
26 First Wall of the Outer Ring
28 Base of the Outer Ring
30 Second Wall of the Outer Ring
32 Outer Ring of the Bearing
34 Inner Ring of the Bearing
36 Roller Bodies
38 Cage
40 Gap of the Washer or Split Wave Spring
100 Thermal Compensation Element
102 First Wall of the Inner Ring
104 inner Ring
106 First Protrusion of the inner Ring
108 Second Wall of the Inner Ring
110 Second Protrusion of the Inner Ring
112 First Wall of the Outer Ring
114 Outer Ring
116 Second Wall of the Outer Ring
200 Thermal Compensation Element
202 First Wall of the inner Ring
204 Inner Ring
206 First Wall of the Outer Ring
208 Outer Ring
210 Second Wall of the Inner Ring
212 Second Wall of the Outer Ring
300 Thermal Compensation Element
302 Groove
304 First Wall of the Inner Ring
306 inner Ring 308 First Tab
310 First Wall of the Outer Ring
312 Outer Ring
314 Groove
316 Second Wall of the Inner Ring
318 Second Tab
320 Second Wall of the Outer Ring
322 Groove
324 Third Tab
326 Groove
328 Fourth Tab
400 Thermal Compensation Element
402 First Wall of the Inner Ring
404 inner Ring
406 First Lip
408 First Wall of the Outer Ring
410 Outer Ring
412 Second Wall of the Inner Ring
414 Second Lip
416 Second Wail of the Outer Ring
418 Third Lip
420 Fourth Lip

What is claimed:

1. A thermal compensation element, comprising:
an outer ring including:
an outer base;
a first outer wall extending from the outer base in a first direction and
bent in a second direction orthogonal to the first direction; and,
a second outer wall extending from the outer base in the first direction to form a first U-shape with the outer base and the first outer wall and including a second distal end
bent in a third direction, opposite the second direction;
an inner ring including:
an inner base; and,
a first inner wall extending from the inner base in a fourth direction, opposite the first direction; and,
a second inner wall extending from the inner base in the fourth direction to form a second U-shape with the inner base and the first inner wall; and,
a split wave spring arranged within the inner ring with the outer ring being mounted over the inner ring so as to encapsulate the washer, wherein the inner ring is displaceable with respect to the outer ring in the first and fourth directions,
wherein:
the first inner wall includes a first outer face with:
a first portion;
a first protrusion extending from the first portion in the third direction and in contact with the first outer wall; and
a second portion extending beyond the first protrusion in the fourth direction; and,
the second inner wall includes a second outer face with:
a third portion;
a second protrusion extending from the third portion in the second direction and in contact with the second outer wall; and,
a fourth portion extending beyond the second protrusion in the fourth direction; or,
wherein:
the first inner wall includes a third distal end bent in the third direction, to contact the first outer wall; and,
the second inner wall includes a fourth distal end bent in the second direction to contact the second outer wall.

2. The thermal compensation element of claim 1, wherein the inner ring has a first channel in which the washer is arranged and the outer ring has a second channel.

3. The thermal compensation element of claim 1, wherein the first inner wall and the second inner wall of the inner ring are of a predetermined length, providing a stop to protect the washer from plastic deformation.

4. The thermal compensation element of claim 1, wherein the thermal compensation element is positioned between a housing/shaft system shoulder and a bearing.

5. The thermal compensation element of claim 4, wherein the bearing is a tandem ball bearing, an angular contact ball bearing, or a tapered roller bearing.

6. The thermal compensation element of claim 4, wherein the bearing is preloaded axially through the thermal compensation element, compressing the washer at a position between fully free and a positive stop.

7. The thermal compensation element of claim 1, wherein the first outer face includes the first portion and the first protrusion.

8. The thermal compensation element of claim 1, wherein the first inner wall includes the third distal end.

9. The thermal compensation element of claim 1, wherein the second outer face includes the third portion and the second protrusion.

10. The thermal compensation element of claim 1, wherein the second inner wall includes the fourth distal end.

* * * * *